United States Patent [19]
Haddock et al.

[11] Patent Number: 4,736,966
[45] Date of Patent: Apr. 12, 1988

[54] DATA CARD WITH PEELABLE PROTECTIVE LAYERS

[75] Inventors: Richard Haddock, Redwood City; Eric Bouldin, Atherton; Christopher J. Dyball, Redwood City, all of Calif.

[73] Assignee: Drexler Technology Corporation, Mountain View, Calif.

[21] Appl. No.: 859,091

[22] Filed: May 2, 1986

Related U.S. Application Data

[63] Continuation-in-part of Ser. No. 831,651, Feb. 20, 1986, abandoned.

[51] Int. Cl.$^4$ .................. B42D 15/00; B32B 5/00; B32B 3/00; G01D 9/00
[52] U.S. Cl. ................................ 283/69; 428/40; 428/900; 346/135.1
[58] Field of Search .............. 283/69, 75, 81, 74; 235/488; 346/135.1, 135, 764; 428/40, 41, 35, 209, 900; 430/14, 13, 10, 531

[56] References Cited
U.S. PATENT DOCUMENTS

| | | | |
|---|---|---|---|
| 3,664,910 | 5/1972 | Hollie | 283/69 |
| 4,310,137 | 1/1982 | Frye | 428/40 |
| 4,339,485 | 7/1982 | Shibano et al. | 428/40 |
| 4,360,728 | 11/1982 | Drexler | 428/900 |
| 4,370,391 | 1/1983 | Mori | 346/135.1 |
| 4,479,838 | 10/1984 | Dunsirn et al. | 283/81 |
| 4,525,412 | 6/1985 | Makane et al. | 346/135.1 |

*Primary Examiner*—Frank T. Yost
*Assistant Examiner*—Paul M. Heyrana, Sr.
*Attorney, Agent, or Firm*—Thomas Schneck

[57] ABSTRACT

An optical data storage medium, such as a data card with a strip of optical data storage material, having peelable transparent protective layers adhered above the storage material. When a protective layer becomes too scratched to read or write through, it may be removed by peeling. More than one layer may be adhered successively above one another, and removed one by one as they become scratched. The peelable protective layers are preferably adhesive tapes made of Aclar, Mylar, polyester, or other hard-to-tear polymers with pressure sensitive adhesive. One or more of the layers, and an underlayer between substrate or card base and the storage material may be a water barrier material such as a polytrichlorofluoroethylene.

23 Claims, 1 Drawing Sheet

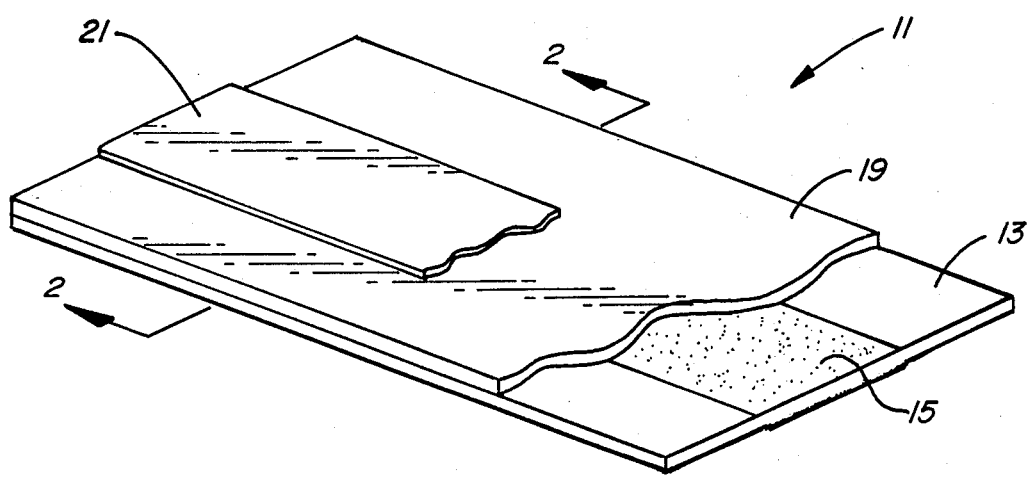
FIG._1.
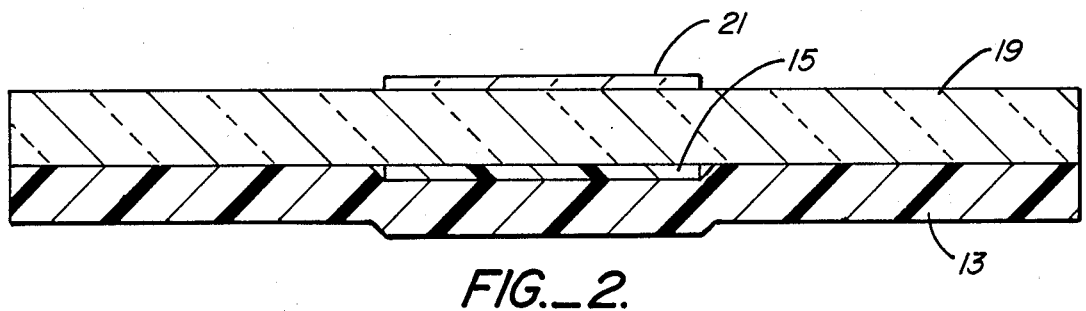
FIG._2.
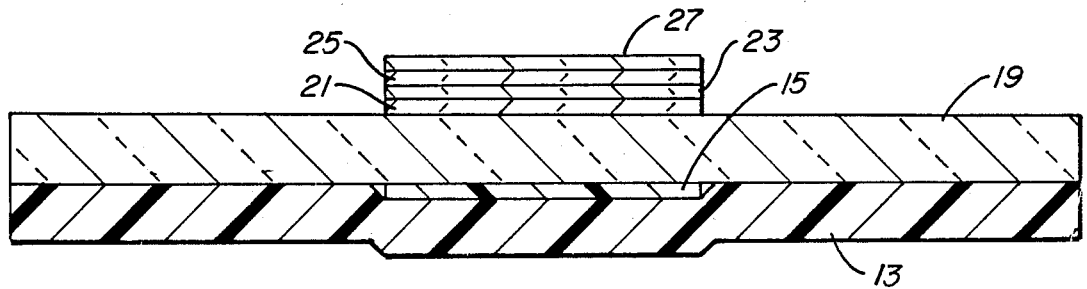
FIG._3.

DATA CARD WITH PEELABLE PROTECTIVE LAYERS

CROSS REFERENCE TO RELATED APPLICATION

This application is a continuation-in-part of U.S. patent application Ser. No. 831,651, filed Feb. 20, 1986, now abandoned.

TECHNICAL FIELD

The present invention relates to optical data storage and in particular to optical data cards having one or more covering protective layers for preventing the degradation of data.

BACKGROUND ART

Optical data storage media typically have scratch resistant protective layers to protect a recording layer from dust and abrasion. In U.S. Pat. No. 4,360,728 to Drexler, a data card has a thin, transparent plastic sheet laminating material or coating covering a strip of optical recording material. In U.S. Pat. No. 4,360,820, Forster et al. disclose a laser recording medium with a protective polymeric coating deposited over all surfaces of the medium.

In U.S. Pat. No. 4,340,655, Hollister discloses a recording medium in which a recording layer is coated with a transparent thermal and mechanical barrier layer of water-soluble polymer. The barrier layer is coated with a water-impermeable spacer layer, so that the medium is resistant to the effects of humidity in the environment. The spacer layer may be coated with an antistatic, abrasion resistant layer.

In U.S. Pat. No. 4,318,970, Kurland et al. teach the use of a glass, optically transparent moisture barrier layer between a hydrophobic substrate, such as polycarbonate material, and a hydrophilic photosensitive layer, such as a gelatin based emulsion. The barrier layer prevents diffusion of water from the substrate to the photosensitive layer.

Recording layers based on metal particles in a gelatin matrix are adversely affected by swelling of the gelatin matrix. Such swelling can change the morphology of recorded spots or pits, degrading the signal from laser reading and introducing errors. Further, the overall reflectivity of the recording surface may be affected, producing inconsistent read signals from pits written at different times. In conditions of elevated temperature (50° C.) and high humidity (90% relative humidity), signals from recorded data spots may be degraded in as short a time as 16 hours. Other recording media, such as dye-polymer and thin film tellurium based media, are also adversely affected by moisture.

Scratch resistant layers and moisture barriers prevent degradation of the recording layers and make optical data storage media durable over long periods of time. However, scratch resistant protection layers do eventually become scratched so that data becomes unreadable. Unless this unreadable data is recorded elsewhere, the data is lost.

Data disks are typically polymethylmethacrylate, polycarbonate or polyethylene terephthalate based with plastic layers at least 40 mils (1 millimeter) thick. Disks are typically used in an office environment, with filtered air and careful handling. By contrast, the total thickness of optical data cards is preferably similar to a credit card thickness of 32 to 34 mils. Small diameter optical disks must also be thin. Cards are also ruggedly treated and subject to dirty environments, being carried about in wallets and pockets. As a result, cards are polycarbonate or polyvinylchloride based and have a base layer only about 15 mils (380 microns) thick. Glass moisture barrier layers as taught by Kurland would be subject to cracking and loss of barrier properties if used in cards.

The object of the invention is to provide an optical data recording and storage medium in which data may be recovered after its protective layer is so scratched that data becomes unreadable.

DISCLOSURE OF INVENTION

The above object has been met using optical data storage media in which a peelable protective layer is adhered to a transparent laminating sheet over optical data storage material disposed on a substrate. "Optical data storage media" includes laser recorded media and optically read media that contains pre-recorded information written by photolithography, injection molding and other means. Data is recordable onto and readable from the storage material through the protective layer. When the protective layer becomes so scratched that data becomes unreadable through the protective layer, the protective layer may be removed by peeling the layer away, to read and thereby recover the data. The medium is preferably a data card in which the substrate is a card base and the storage material is in the form of a strip disposed on the card base. A transparent laminating sheet covers the card base and strip.

The protective layer, which is generally a transparent adhesive tape composed of a scratch resistant material, is adhered over the storage material to the laminating sheet so that it has no bubbles between the protective layer and sheet that might interfere with data recording and reading, and so that the layer may be easily peeled off without tearing or leaving pieces.

A plurality of additional peelable protective layers may also be successively adhered above the first mentioned protective layer that is adhered over the storage material. Data is recordable and readable through all of the protective layers and when a top protective layer becomes too scratched, it may be removed, leaving the next lower protective layer in place. Preferably the additional peelable protective layers may be adhered with successively weaker adhesions than lower protective layers, thereby ensuring that only one protective layer is peeled off at a time. Layer bonds with equal adhesive strength may also be used.

One of the advantages of peelable protective layers is that the medium is durable for longer periods of time. Each additional protective layer adds to the durability of the medium. One of the chief advantages is that even when the scratch resistant protective layer becomes so scratched that data becomes unreadable through the protective layer, the data can still be recovered by removing the top protective layer and reading the data.

It is preferable to use a relatively low numerical aperture lens system in conjunction with cards having different numbers of peelable layers on them in order to minimize the spherical aberration in the optical system.

BRIEF DESCRIPTION OF THE DRAWINGS

FIG. 1 is a perspective view of a data card of the present invention.

FIG. 2 is a section view taken along the line 2—2 in FIG. 1.

FIG. 3 is a section view of an alternate embodiment of the card in FIG. 1.

BEST MODE OF CARRYING OUT THE INVENTION

With reference to FIGS. 1 and 2, a data card 11 is illustrated having a size common to most credit cards. The width dimension of such a card is approximately 55 mm and the length dimension is approximately 85 mm. These dimensions are not critical, but preferred because such a size easily fits into a wallet and has historically been adopted as a convenient size for automatic teller machines and the like. The card's base 13 is selected from plastic material, such as polyvinylchloride or polycarbonate. Alternatively, metals such as aluminum may be used. The base is approximately 10 mils thick.

Base 13 carries an optical data storage medium strip 15. The strip is between 1 and 54 mm wide, preferably 16 or 35 mm wide and extends the length of the card. Alternatively, the strip may have other sizes and orientations, but should accommodate at least 250,000 bits of binary data. The strip is relatively thin, approximately 100-500 micrometers thick, although this is not critical. The strip may be applied to the card by any convenient method which achieves flatness of the strip. Flatness of the upper surface of the card is also desired. The strip is adhered to the card with an adhesive and covered by a transparent laminating sheet 19 which serves to keep 15 flat, as well as protecting the strip from dust and scratches. Sheet 19 is a thin, about 15 mils, transparent plastic sheet laminating material or coating, such as a transparent lacquer. Sheet 19 typically has a light transmission of at least 75%. Since transparent sheet 19 is thicker than base 13 and stiffer than the base, the base tends to have a slight depression below the strip. The base 13, strip 15 and sheet 19 may be unwound from reels and brought together in "sandwich" fashion to form a laminated structure, then trimmed to the desired areawise dimensions.

A peelable protective layer 21 is adhered to the transparent laminating sheet 19 over strip 15. Protective layer 21 is generally a strip of scratch resistant material adhered with pressure sensitive adhesive. The protective layer 21 must be adhered to sheet 19 so that no bubbles that might interfere with data recording and reading are present between layer 21 and sheet 19. The protective layer should also be easy to remove without tearing. Commercially available, clear adhesive tapes that are made of 2 to 10 mil (50 to 250 micrometers) thick Mylar or other polyester material are preferred. Mylar is a registered trademark of Dupont Co. for a polyethylene terephthalate sheet material. Adhesive tapes made of cellophane or tapes which are thinner than about 2 mils (50 micrometers) tend to tear and leave pieces of tape on the card surface and are therefore not ordinarily suitable unless great care is taken during removal. Moisture barrier materials may be used for protective layer 21.

Protective layer 21 may be applied during manufacture with rollers or may be applied by hand. Likewise, protective layer 21 may be removed by the user by carefully peeling back the tape at the edges and then lifting the tape off. When the protective layer 21 is removed, a new peelable protective layer 21 may be applied or the data on the card read for the last time and transferred to a new card.

A high resolution optical data storage medium forms strip 15 and may be any optically reflective recording material so long as the material can be formed on a thin substrate. A "strip" is a length of material generally, but not necessarily, having a uniform width and generally extending the length of base 13. An advantage of reflective materials over transmissive materials is that the read/write equipment is all on one side of the card and automatic focus is easier. For example, the high resolution material described in U.S. Pat. No. 4,230,939 issued to de Bont, et al. teaches a thin metallic recording layer of reflective metals such as Bi, Te, In, Sn, Cu, Al, Pt, Au, Rh, As, Sb, Ge, Se, Ga. Materials which are preferred are those having high reflectivity and low melting point, particularly Cd, Sn, Tl, In, Bi, and amalgams.

Suspensions of reflective metal particles in organic colloids also form low melting temperature laser recording media. Silver is one such metal. Preferred recording media are described in U.S. Pat. Nos. 4,314,260, 4,298,684, 4,278,758, 4,278,756, 4,269,917, 4,284,716, 4,312,938, 4,363,870, 4,396,701, 4,383,024, and 4,304,848, all assigned to the assignee of the present invention.

The laser recording material which is selected should be compatible with the laser which is used for writing on it. Some materials are more sensitive than others at certain wavelengths. Good sensitivity to near-infrared light is preferred because near-infrared is affected less by scratches and dirt on the protective layer or laminating sheet. The selected recording materials should have a favorable signal-to-noise ratio and form high contrast data bits with the read/write system with which it is used. A large number of highly reflective laser recording materials have been used for optical data disk applications.

The material should not lose data when subjected to temperatures of about 122° F. (50° C.) for long periods. The material should be capable of recording at speeds of at least several thousands bits/sec. This generally precludes the use of materials that require long heating times or that rely on slow chemical reactions in the presence of heat, which may permit recording only a few bits/sec.

Data is recorded by forming spots in the surrounding field of the reflective layer itself, thereby altering the reflectivity in the data spots. Data is read by detecting the optical reflective contrast between the surrounding reflective field or unrecorded areas and the recorded spots. Spot reflectivity of less than half the reflectivity of the surrounding field produces a contrast ratio of a least two to one, which is sufficient contrast for reading. Greater contrast is preferred. Reflectivity of the stripe field of about 50% is preferred with reflectivity of a spot in the reflective field being less than 20%, thus creating a contrast ratio of greater than two to one. Alternatively, data may also be recorded by increasing the reflectivity of the strip. For example, the recording laser can melt a field of dull microscopic spikes on the strip to create flat shiny spots. This method is described in SPIE, Vol. 329, Optical Disk Technology (1982), p. 202. A spot reflectivity of more than twice the surrounding field reflectivity produces a contrast ratio of at least two to one, which is sufficient contrast for reading.

Data is readable and recordable through protective layer 21 and also with protective layer 21 removed. Protective layer 21 typically reduces reflectivity of the card by about two percent, but the contrast ratio is only slightly affected. For example, a card without protective layer 21 may have a spot reflectivity of 11 percent in a surrounding field with 30 percent. Adding a protective layer 21 reduces the spot reflectivity to about 9 percent and the field reflectivity to about 28 percent. The contrast ratio changes from 2.7 to 1 to a ratio of 3.1 to 1 upon adding the protective layer.

With reference to FIG. 3, an alternate embodiment of data card 11 comprises a card base 13, a strip 15, a sheet 19, and a plurality of scratch resistant, peelable protective layers 21, 23, 25, and 27. The card in FIG. 3 is identical in all respects to the card in FIGS. 1 and 2 except that additional protective layers 23, 25, and 27 are applied successively above the first protective layer 21. Although four protective layers are shown, other numbers of protective layers may be used provided that the total thickness of protective layers does not exceed about 15 mils (380 micrometers).

The additional protective layers 23, 25, and 27 may be identical in composition to first protective layer 21 or they may be different. For example, the protective layers 21, 23, 25, and 27 may be tapes having successively weaker adhesions from bottom to top. Layer 23 may have a weaker adhesion than layer 21, layer 25 may have a weaker adhesion than layer 23, and layer 27 may have a weaker adhesion than layer 25. This ensures that when a top layer is removed, other layers beneath that top layer are not accidentally removed with that top layer. Tabs, not shown, may be added to the ends of protective layers 21, 23, 25, and 27 to aid in the removal of layers without tearing. If first protective layer 21 is composed of a moisture barrier material, the additional layers 23, 25, and 27 may also be, but need not be, composed of moisture barrier materials. Acrylic adhesives are used between layers with relative strength controlled in any of several warps. Heavier coating provides greater adhesion as does higher cross linking of the adhesive.

Data is readable and recordable through all of the protective layers 21, 23, 25, and 27. When a top protective layer becomes too scratched to read through without error, it may be removed, leaving the next lower protective layer in place. When the lowest protective layer 21 is removed, data is read for the last time and transferred to a new card, or alternatively, new peelable protective layers are added.

Typical optical data reading and writing systems in the art have error checking procedures built into them. For example, some systems have error checking bits written onto a data disc or data card. When an error in reading the error checking bits occurs, the error is flagged for that particular sector or track. Other systems read a sector or track more than once, and compare the results for different reads. Correction of errors for this type of system is possible. However, when errors due to dirt on surfaces become so numerous that data errors cannot be corrected, the system flags the error. In accord with the present invention, error flags can be used to indicate that a protective layer is sufficiently scratched that data becomes unreadable through the layer, and that the layer needs to be removed by peeling. Once a scratched layer is removed, the error checking system resets itself and data reading and recording may continue. Cards of the present invention are thus capable of recovering from errors due to scratches and dirt.

We claim:
1. An optical data storage medium comprising,
a planar substrate,
a strip of optical data storage material disposed on said substrate, with a transparent laminated sheet covering said substrate and said strip,
a peelable transparent protective layer adhered to said transparent laminating sheet, data stored on said storage material strip being readable through said protective layer, said peelable protective layer being removable from said laminated sheet after said protective layer has become scratched.
2. The medium of claim 1 wherein said protective layer is scratch resistant.
3. The medium of claim 2 wherein said protective layer comprises polyester.
4. The medium of claim 1 wherein said protective layer is hydrophobic.
5. The medium of claim 4 wherein said protective layer comprises polytrichlorofluroethylene or its copolymers.
6. The medium of claim 4 wherein said protective layer comprises polyvinylidenechloride or its copolymers.
7. The medium of claim 1 further comprising additional peelable transparent protective layers adhered with successively equal or weaker adhesion above said protective layer adhered to said storage material, data stored on said data storage material strip being readable through all of said protective layers, a top one of said peelable protective layers being removable after said top protective layer has become scratched.
8. The medium of claim 7 wherein each of said additional protective layers are scratch resistant.
9. A data card comprising,
a card base,
a strip of optical data storage material disposed on said card base, and a transparent laminated sheet covering said base and said strip,
a peelable transparent protective layer adhered to said transparent laminating sheet, data stored on said strip being readable through said protective layer, said peelable protective layer being removable from said laminated sheet after said protective layer has become scratched.
10. The card of claim 9 wherein said protective layer is scratch resistant.
11. The card of claim 10 wherein said protective layer comprises polyester adhesive tape.
12. The card of claim 9 wherein said protective layer is hydrophobic.
13. The card of claim 12 wherein said protective layer comprises an adhesive tape based on polytrichlorofluroethylene or its copolymers.
14. The card of claim 12 wherein said protective layer comprises an adhesive tape based on polyvinylidenechloride or its copolymers.
15. The card of claim 9 further comprising additional peelable protective layers adhered with successively equal or weaker adhesion, disposed above said peelable protective layer adhered to said transparent laminating sheet, data stored on said strip being readable through all of said protective layers, a top one of said peelable protective layers being removable after said top protective layer has become scratched.
16. The card of claim 15 wherein each of said additional peelable protective layers are scratch resistant.
17. The card of claim 16 wherein said additional layers are polyester adhesive tape.
18. The card of claim 9 wherein data is recordable onto said strip through said peelable protective layers.

19. The card of claim 15 wherein data is laser recordable onto said strip through all of said protective layers.

20. A data card comprising,
a card base,
a strip of optical data storage material disposed on said card base,
a transparent laminating sheet covering said base and said strip, and
a removable, scratch resistant, peelable protective layer adhered over said strip to said sheet, data being laser recordable onto said strip through said protective layer, data stored on said strip being readable through said protective layer, data also being recordable and readable on said strip with said protective layer removed.

21. The data card of claim 20 wherein said protective layer is hydrophobic.

22. The data card of claim 21 wherein said protective layer comprises polytrichlorofluoroethylene or copolymers thereof.

23. The data card of claim 20 wherein said peelable protective layer is a polyester adhesive tape.

* * * * *